United States Patent
Garcia-Atance Fatjo

(10) Patent No.: US 11,260,927 B2
(45) Date of Patent: Mar. 1, 2022

(54) TRICYCLE WITH HEIGHT-TILTING WHEEL SUSPENSION LINKED TO THE DRIVING HANDLEBAR

(71) Applicant: Gonzalo Garcia-Atance Fatjo, Guadalajara (ES)

(72) Inventor: Gonzalo Garcia-Atance Fatjo, Guadalajara (ES)

( * ) Notice: Subject to any disclaimer, the term of this patent is extended or adjusted under 35 U.S.C. 154(b) by 27 days.

(21) Appl. No.: 16/784,936

(22) Filed: Feb. 7, 2020

(65) Prior Publication Data
US 2020/0262503 A1    Aug. 20, 2020

(30) Foreign Application Priority Data

Feb. 19, 2019 (EP) .................... 19382119

(51) Int. Cl.
*B62K 5/08*    (2006.01)
*B62D 7/16*    (2006.01)
(Continued)

(52) U.S. Cl.
CPC ............ *B62K 5/08* (2013.01); *B62D 7/16* (2013.01); *B62D 9/02* (2013.01); *B62K 5/05* (2013.01);
(Continued)

(58) Field of Classification Search
CPC ... B62K 5/05; B62K 5/08; B62K 5/10; B62K 2005/001; B62K 2201/00; B62K 2015/001; B62K 15/006; B62D 7/16; B62D 9/02
See application file for complete search history.

(56) References Cited

U.S. PATENT DOCUMENTS

| 3,561,778 A | 2/1971 | Brie |
| 4,020,914 A | 5/1977 | Trautwein |

(Continued)

FOREIGN PATENT DOCUMENTS

| CA | 2298146 A1 * | 8/2000 | ............. B62B 17/00 |
| CN | 102470909 A * | 5/2012 | ............... B62K 5/10 |

(Continued)

OTHER PUBLICATIONS

Description Translation for CN-102470909-A (Year: 2012).*
Description Translation for CN-105383623-A (Year: 2016).*
Description Translation for FR-3010042 (Year: 2015).*

*Primary Examiner* — James A English
*Assistant Examiner* — Daniel M. Keck
(74) *Attorney, Agent, or Firm* — Lucas & Mercanti, LLP

(57) ABSTRACT

A tricycle for riding on any type of terrain, improving stability and safety in slow movement, having a structural chassis incorporating a rolling assembly made up of a rear wheel associated to a propulsion system and two front wheels linked to a driving handlebar, wherein the front wheels are incorporated in a height-tilting suspension, made up of articulated quadrilaterals able to be deformed independently with vertical movement depending on the individual resting of the front wheels on irregularities of the terrain, the height-tilting suspension linking to the handlebar, by means of a transmission, which links the height-oscillating movements of the articulated quadrilaterals of the height-tilting transmission with an equivalent lateral tilting of the handlebar, this transmission having a clutch which allows for enabling or disabling the linkage of the movements between the height-tilting suspension and the handlebar.

17 Claims, 18 Drawing Sheets

(51) Int. Cl.
*B62D 9/02* (2006.01)
*B62K 5/05* (2013.01)
*B62K 5/10* (2013.01)
*B62K 5/00* (2013.01)

(52) U.S. Cl.
CPC .......... *B62K 5/10* (2013.01); *B62K 2005/001* (2013.01); *B62K 2201/00* (2013.01)

(56) References Cited

U.S. PATENT DOCUMENTS

| | | | |
|---|---|---|---|
| 4,072,325 A | 2/1978 | Bright et al. | |
| 4,351,410 A | 9/1982 | Townsend | |
| 4,432,561 A | 2/1984 | Feikema | |
| 4,469,344 A | 9/1984 | Coil | |
| 4,634,137 A | 1/1987 | Cocksedge | |
| 4,740,004 A | 4/1988 | McMullen | |
| 5,568,935 A | 10/1996 | Mason | |
| 5,762,351 A * | 6/1998 | SooHoo | B60G 21/007 180/210 |
| 6,367,824 B1 | 4/2002 | Hayashi | |
| 6,817,617 B2 | 11/2004 | Hayashi | |
| 7,073,806 B2 | 7/2006 | Bagnoli | |
| 7,487,985 B1 | 2/2009 | Mighell | |
| 7,530,419 B2 | 5/2009 | Brudeli | |
| 7,665,749 B2 | 2/2010 | Wilcox | |
| 7,708,291 B1 | 5/2010 | Henderson | |
| 2002/0190494 A1 * | 12/2002 | Cocco | B62K 5/10 280/124.135 |
| 2007/0176384 A1 | 8/2007 | Brudeli | |
| 2015/0069732 A1 | 3/2015 | Godlewski | |
| 2020/0172192 A1 * | 6/2020 | Terada | B62K 5/007 |

FOREIGN PATENT DOCUMENTS

| | | | | |
|---|---|---|---|---|
| CN | 105383623 A | * | 3/2016 | ............. B62J 25/00 |
| FR | 3010042 A1 | * | 3/2015 | ............. B60G 3/20 |

* cited by examiner

TRICYCLE WITH HEIGHT-TILTING WHEEL SUSPENSION LINKED TO THE DRIVING HANDLEBAR

CROSS REFERENCE TO RELATED APPLICATION

This application claims the benefit of priority of European Patent Application No. 19382119.6, filed on Feb. 19, 2019, which is incorporated herein by reference.

TECHNICAL FIELD

The present invention is related to cross-country and mountain biking, proposing a tricycle intended for this purpose made with characteristics which improve the stability conditions when driving, particularly in a slow uphill ride on uneven terrain.

STATE OF THE ART

In the past few decades, mountain biking has become more and more popular and, in relation to it, different types of bicycles have been developed in order to improve the riding conditions in different circumstances and types of terrain, such as mountain bikes designed for quick movements over irregular terrain uphill and downhill, cross-country bicycles for movement along paths and uneven terrain, etc.

Given the difficulty of staying upright, in some conditions, when riding on two-wheeled bicycles, embodiments of tricycles have also been developed, with which, by means of a triangular support on three points, staying in the vertical use position is facilitated without the cyclist needing to apply special effort to do so.

In this regard, for example, document US 2015/0069732 discloses a tricycle with two front parallel wheels and one rear one, wherein the two front wheels are close to each other in a fixed relative position between them. With this embodiment, the inclination of the tricycle for making turns is based on an unequal compression of the tyres of the parallel front wheels and/or the structure of the assembly, meaning the inclination angle of the tricycle is very limited and the tricycle can only incline further by lifting one wheel from where it rests on the ground, which translates into a risk of flipping over.

Other embodiments, such as those of documents U.S. Pat. Nos. 6,817,617, 6,367,824 and 4,740,004, consist of tricycles provided with two parallel front wheels joined to corresponding inclination systems made up of cross beams; meanwhile, document U.S. Pat. No. 7,708,291 shows a tricycle similar to those above, wherein the cross beams have a shape which enables the centre of mass to change towards the inner wheel during turns. Likewise, other tricycles which use two cross beams as a main component of an inclination system are described in U.S. Pat. Nos. 7,487,985, 7,073,806, 4,634,137, 4,351,410 and 4,072,325.

The documents U.S. Pat. Nos. 5,568,935, 4,469,344 and 4,432,561, show, if applicable, tricycles wherein the cyclist can control the inclination of the parallel front wheels, but that inclination and the steering are coupled, such that they cannot be controlled independently. As for the documents US 2007/0176384, U.S. Pat. No. 7,665,749, 7,530,419, 4,020,914 and 4,088,199, they relate to motorised vehicles wherein the driver can control the inclination angle regardless of the steering when transferring weight from one foot to the other.

Furthermore, document U.S. Pat. No. 3,561,778A describes a tricycle which can be balanced by actuating on a handlebar with two parts, each of which is joined to one of the parallel front wheels.

However, all of the indicated embodiments have a stability problem in slow uphill riding on irregular and uneven terrain, there being a high risk of accidents due to flipping over in these circumstances, or they have the problem of not enabling riding at high speeds over said terrain.

Object of the Invention

According to the present invention, a tricycle is proposed which enables riding in suitable conditions on any type of terrain, improving the stability and safety during slow uphill movements on irregular and uneven or laterally inclined terrain and, in turn, also enables riding at high speeds on irregular and uneven terrain.

This tricycle object of the invention comprises a movement assembly made up of a rear wheel associated to a propulsion system and two parallel front wheels associated to a steering system and a height-tilting suspension system, the steering system being made up of a handlebar which can be rotated and tilted and that is provided with a lower shank that is linked to each of the parallel front wheels by means of respective connecting rods which make them rotate towards the sides when the handlebar is rotated, while the height-tilting suspension is made up of, in relation to each of the parallel front wheels, by an articulated quadrilateral which is linked to the handlebar by means of a transmission that makes the handlebar tilt in height when the parallel front wheels tilt in height, said transmission having a clutch which allows for enabling or disabling the linkage of the movement between the height-tilting suspension and the handlebar.

Thus, the parallel front wheels of the tricycle can be steered for the driving of the tricycle in a manner similar to a conventional cycle, by means of the handlebar, while with the transmission enabled between the height-tilting suspension and the handlebar, when the front parallel wheels pass over irregularities or obstacles of the terrain, they move in height keeping the tricycle upright, while with that movement in height of the parallel front wheels the handlebar tilts in a corresponding manner, which enables the cyclist using the tricycle to efficiently control the stability, in order to ride with safety, for example, in slow uphill movements on terrain with irregularities or on laterally inclined terrain.

The control of the driving in other circumstances, such as in quick downhill riding and on flat terrain can be ensured, if applicable, by disabling, by means of the clutch, the transmission which links the height-tilting movement of the parallel front wheels and the tilting of the driving handlebar.

In light of this, the proposed tricycle results in functional characteristics which make it advantageous for the application of use in terrain of any type, taking on a life of its own and preferred character with respect to conventional tricycles that have been developed for the same uses.

DETAILED DESCRIPTION OF THE INVENTION

Figure 1:
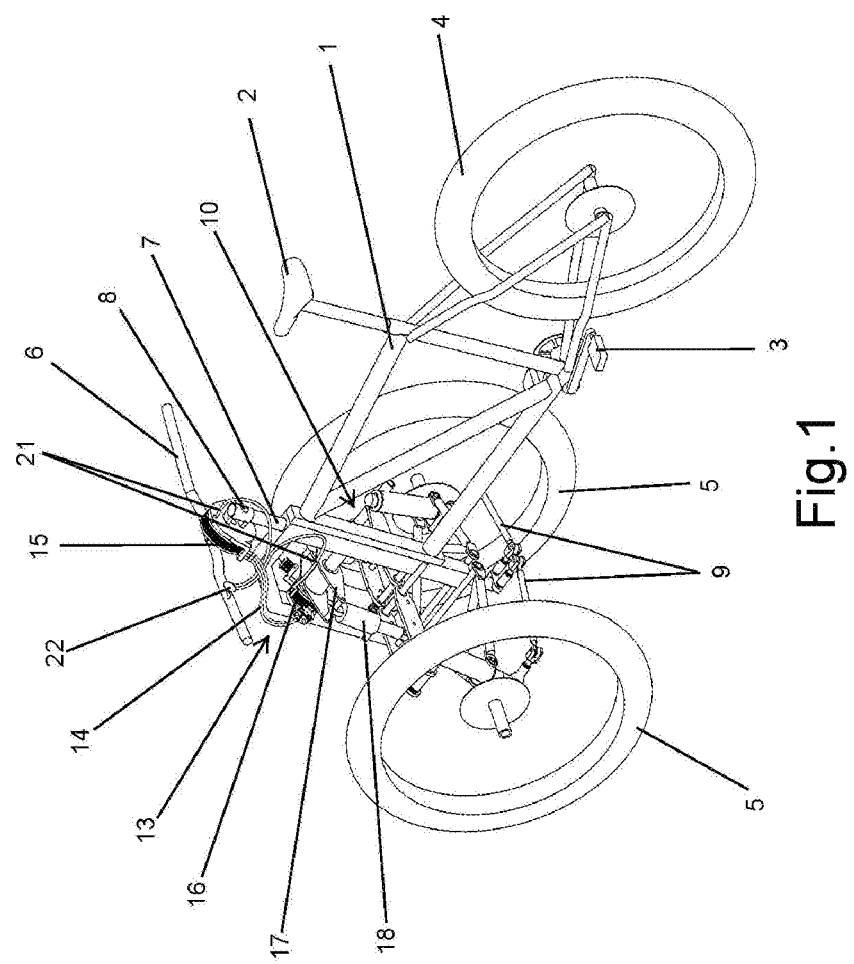
FIG. 1 shows a perspective of an exemplary embodiment of a tricycle according to the object of the invention.
Figure 2:
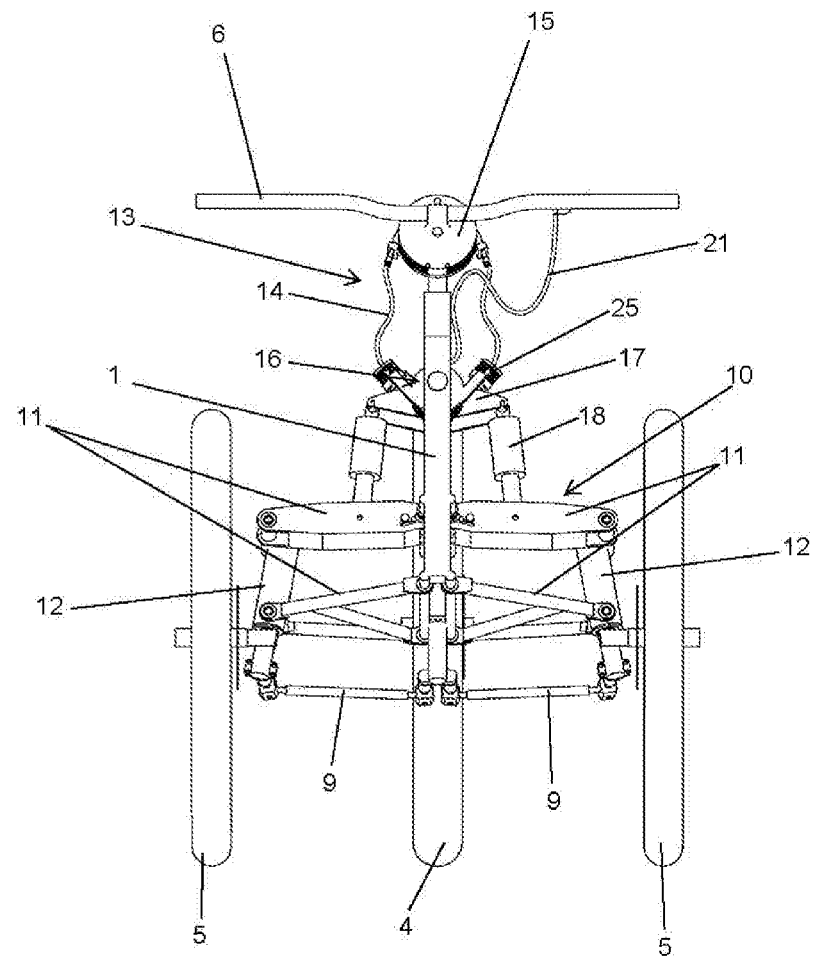
FIG. 2 is a front view of the tricycle of the previous figure.
Figure 3:
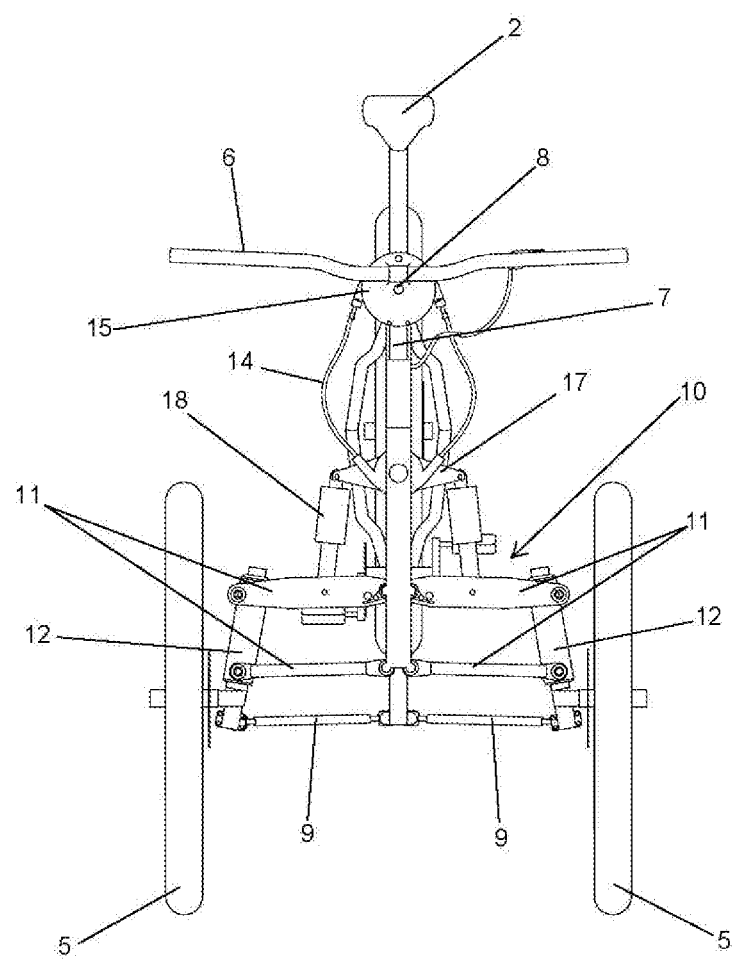
FIG. 3 is a front view of the tricycle from a more elevated observation point than that of the previous figure.

The object of the invention relates to a tricycle which enables riding in suitable conditions on any type of terrain, comprising a structural chassis (1) wherein it incorporates a seat (2) and pedals (3), having a rolling assembly made up of a rear wheel (4) and two parallel front wheels (5).

The parallel front wheels (5) are linked to a driving handlebar (6) which is incorporated on a directional rotation shank (7) and on which said handlebar (6) can furthermore tilt towards the sides by pivoting on a shaft (8) which is substantially horizontal in the longitudinal direction, that shank (7) being joined to each of the parallel front wheels (5) by means of respective connecting rods (9) which make it rotate directionally when the handlebar is rotated (6).

In the assembly, the mentioned parallel front wheels (5) are incorporated in a height-tilting suspension (10), which enables said parallel front wheels (5) to be able to individually vary the position thereof in height when they pass over obstacles or irregularities of the terrain when riding with the tricycle, or when moving on laterally inclined terrain, meaning the tricycle adapts to the orography of the terrain, staying vertical at all times during riding, regardless of the terrain on which it is rode.

The height-tilting suspension (10) has corresponding articulated quadrilaterals in relation to each of the parallel front wheels (5), each one of said articulated quadrilaterals being made up of substantially horizontal arms (11), which on one end are articulately joined to the structural chassis (1) of the tricycle and on the other end joined to each other by means of a substantially vertical cross member (12) articulated with them.

Said height-tilting suspension (10) is linked to the handlebar (6) by means of a transmission (13) which links the height-varying movement of the parallel front wheels (5) to a corresponding tilting movement of the handlebar (6) towards the sides, which makes it so when those parallel front wheels (5) vary the position thereof in height due to the orographies of the terrain whereon it is rode, the handlebar (6) correspondingly adapts to that variation in position, enabling the cyclist using the tricycle to be able to safely control the stability of the tricycle while driving, for example, in a slow uphill ride on uneven terrain, wherein maintaining the stability while driving is difficult and brings with it a large risk of falling or of the user needing to place a foot on the ground and not being able to continue pedalling.

Nevertheless, the mentioned transmission (13) has a clutch which allows for enabling or disabling the linkage of the movement between the height-tilting suspension (10) and the handlebar (6), thereby also selectively enabling a locking arrangement of the handlebar (6) in a horizontal position, in order to facilitate safe driving in quick downhill or flat rides, on terrain of any type.

According to one embodiment, the transmission (13) is established by means of a cable (14) which passes through a pulley (15) secured to the handlebar (6) and through another pulley (16) which is secured to a cross bar (17) arranged in a joint tilting towards the sides along the middle area of the length thereof, with respect to the chassis (1) of the tricycle, and joined on the ends, by means of respective shock-absorbers (18), to the articulated quadrilaterals of the height-tilting suspension (10).

Thus, when one of the parallel front wheels (5) oscillates in height when passing over an obstacle or an irregularity of the terrain on which the tricycle is rode, the oscillating movement is made perceptible by the corresponding articulated quadrilateral of the height-tilting suspension (10), being transmitted through the respective shock-absorber (18) to the cross bar (17), which tilts correspondingly by rotating the pulley (16), the rotating movement of which is transmitted through the cable (14) to the pulley (15), which with the rotation thereof, in turn, makes the handlebar (6) tilt to an inclined position correlating to the variation in height of the parallel front wheel (5) that has oscillated, thereby allowing the cyclist using the tricycle to be able to more safely control the stability of the driving in those circumstances.

Figure 17:
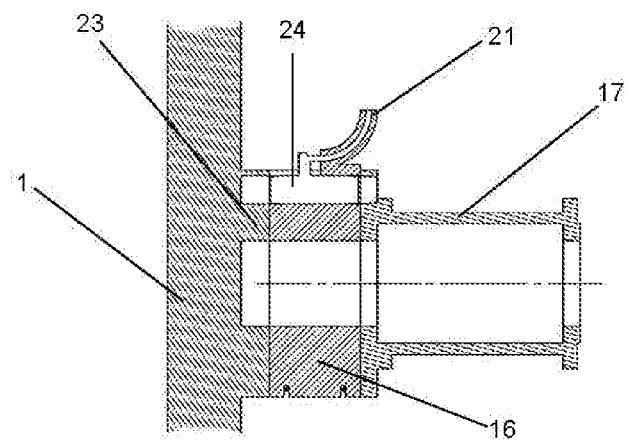
FIG. 17 is a cross-sectional view of a pulley linked to the height-tilting suspension of the parallel front wheels, in a cable transmission between said height-tilting suspension of the parallel front wheels and the handlebar of the tricycle.

The pulley (16) is incorporated in a rotating assembly that rotates on a plate (23) secured to the structural chassis (1) of the tricycle, as seen in FIG. 17, incorporating an operable pin (24) by means of which the transmission (13) of the inclination of the wheels (5) to the handlebar (6) is enabled or disabled. When the operable pin (24) is inserted into the cross bar (17), it makes the pulley (16) couple to the cross bar (17), enabling the transmission of the inclination to the handlebar (6). Conversely, when the operable pin (24) is taken out of the cross bar (17), it disables the transmission of the inclination to the handlebar (6). When the operable pin (24) is inserted into the plate (23), the handlebar (6) is locked in the horizontal position, letting the cross bar (17) tilt freely without hindering the inclination of the tricycle.

Figure 16:
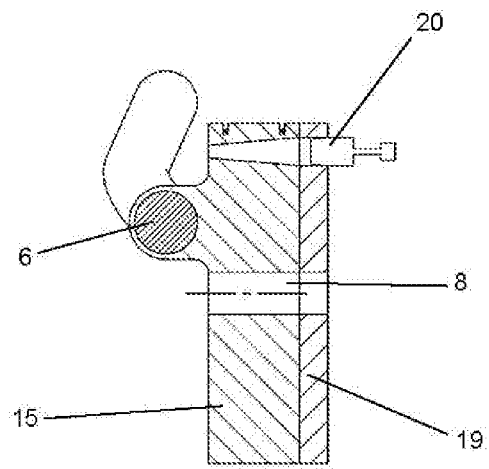
FIG. 16 is a cross-sectional view of a pulley joined to the handlebar in an embodiment with cable transmission between the height-tilting suspension of the parallel front wheels and the handlebar of the tricycle.

Moreover, the pulley (15) is incorporated in a rotating assembly that rotates on a plate (19) secured to the shank (7) of the handlebar (6), this assembly incorporating an operable pin (20), which can be moved between a retracted position in the plate (19), leaving the rotation movement of the mentioned pulley (15) free, as seen in FIG. 16, and an advanced position wherein said operable pin (20) is further inserted in the pulley (15) locking the rotation thereof.

As such, by means of the movement of the operable pin (20), the stiffness and resistance to the inclination of the handlebar (6) in the horizontal position when the transmission of the tilting movement of the wheels (5) is not enabled can be increased.

To this end, the movement of the operable pin (20) and/or of the operable pin (24) between the operating positions thereof, can be manual by means of direct actuation by the user on said operable pins (20 and 24); however, for greater comfort an embodiment is envisaged with actuation of said movements of the operable pins (20 and 24) by means of at least one cable (21) from a control (22) incorporated in the handlebar (6).

Figure 4:
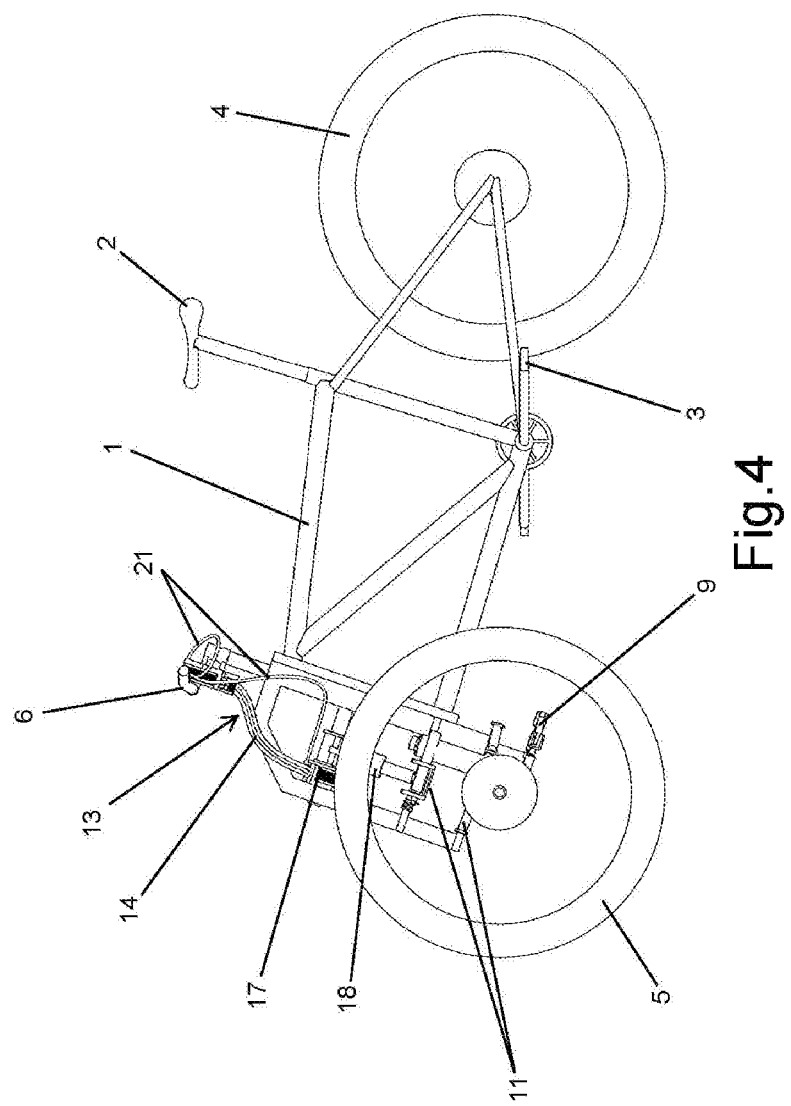
FIG. 4 is a side view of the tricycle.
Figure 5:
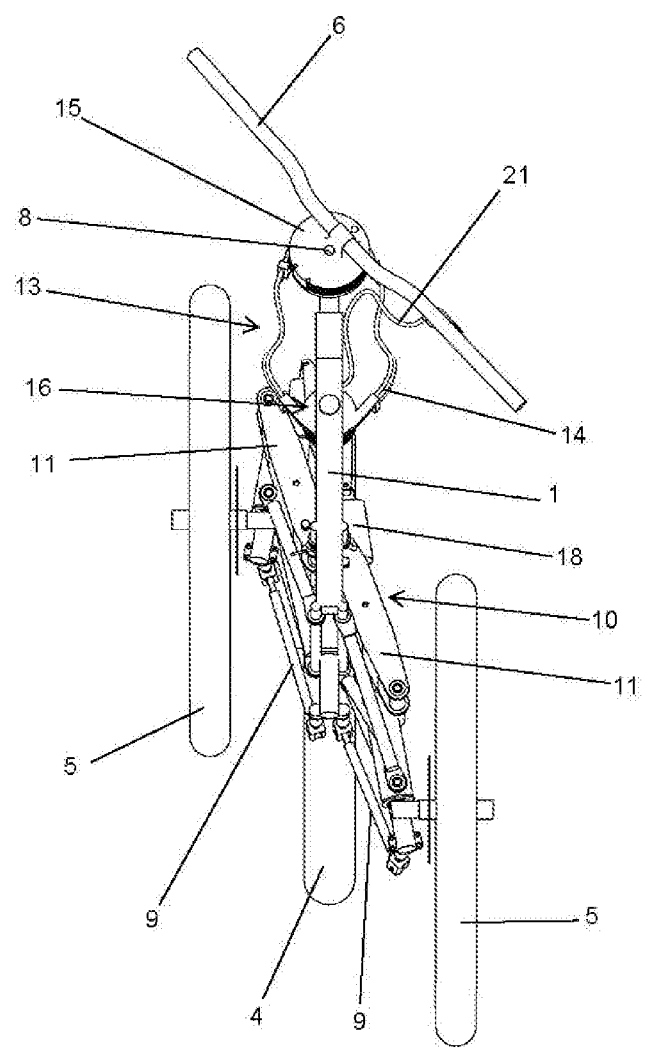
FIG. 5 is a front view of the tricycle in a riding position over an obstacle or on laterally inclined terrain, with the transmission enabled between the height-tilting suspension of the parallel front wheels and the handlebar.
Figure 6:
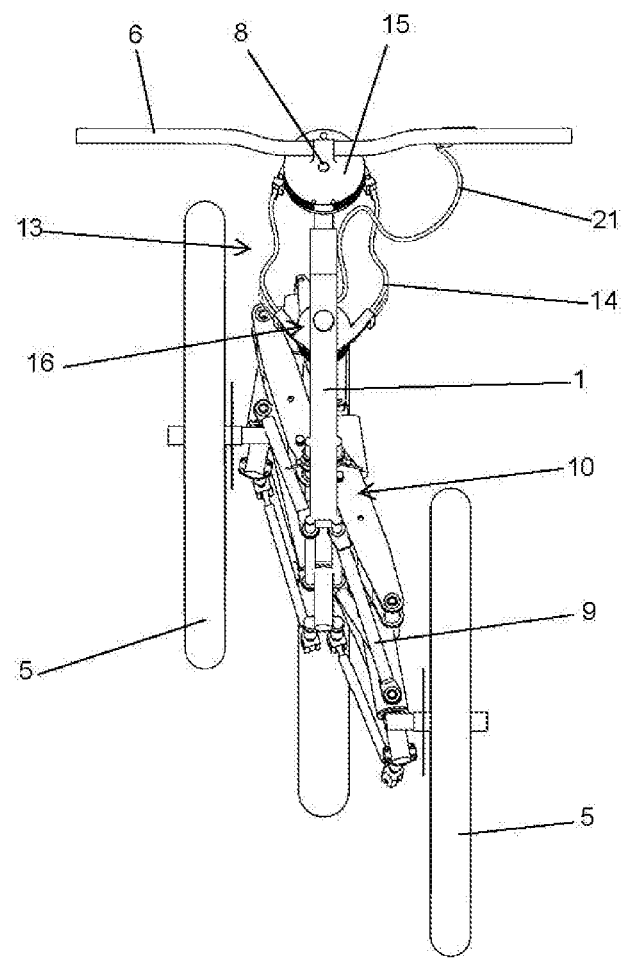
FIG. 6 is a front view of the tricycle in a riding position over an obstacle or on laterally inclined terrain, with the transmission disabled between the height-tilting suspension of the parallel front wheels and the handlebar.

For greater safety of the transmission (13), it is envisaged that the cable (14) thereof is made up of several parallel cables, as seen in FIG. 4, meaning that, even if one of the cables is broken while the tricycle is in use, the linkage of the movement between the movement between the oscillations in height of the parallel wheels (5) and the tilting of the handlebar (6) is still maintained, in order to adapt the driving conditions as appropriate.

Figure 18:
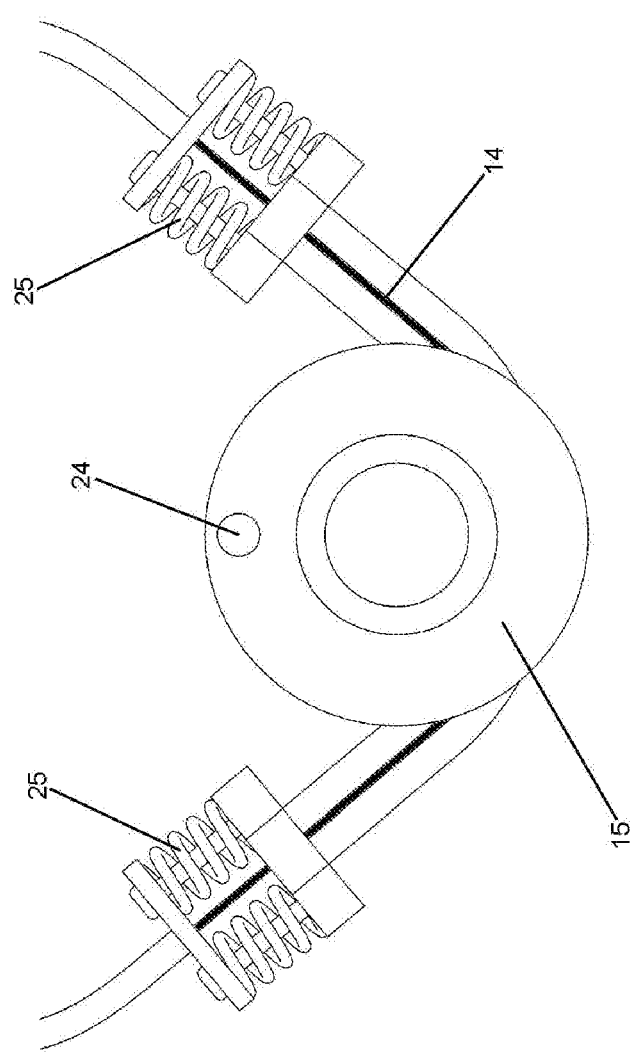
FIG. 18 is a view of the arrangement of elastic tension of a cable in the transmission between the height-tilting suspension of the parallel front wheels and the handlebar of the tricycle according to the embodiment of the previous figures.

Furthermore, in order to prevent overloading which can cause the cable (14) to break, it is foreseen that said cable is associated to joints with elastic elements (25), as seen in FIG. 18, with which the safety maintenance conditions of the transmission (13) are also improved.

In any case, the linkage between the oscillating movement of the height-tilting suspension (10), together with the parallel front wheels (5) and the lateral tilting movement of the handlebar (6) is not limiting for this embodiment by means of a cable (14), simple or multiple, being able to be established with other types of functional embodiments able to develop the same effect, for example, with a hydraulic transmission embodiment or others.

Figure 19:
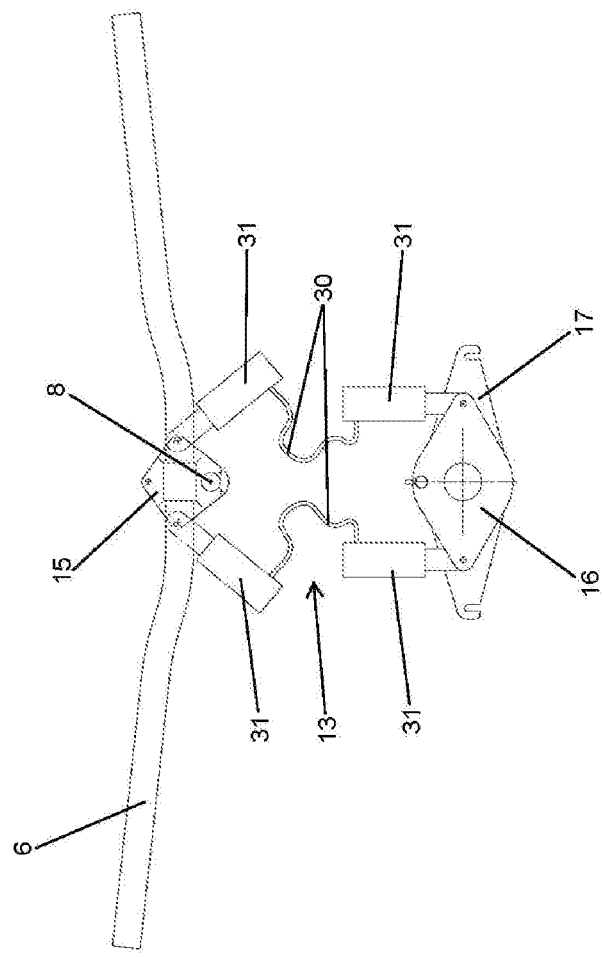
FIG. 19 is a perspective view of an alternative embodiment, with hydraulic cylinders, of the transmission between the height-tilting suspension of the parallel front wheels and the handlebar of the tricycle.

As seen in the alternative embodiment of FIG. 19, the indicated linkage can be established by means of hydraulic cylinders (31) connected by hoses (30); instead of by the cables (14) of the preferred embodiment.

Figure 20:
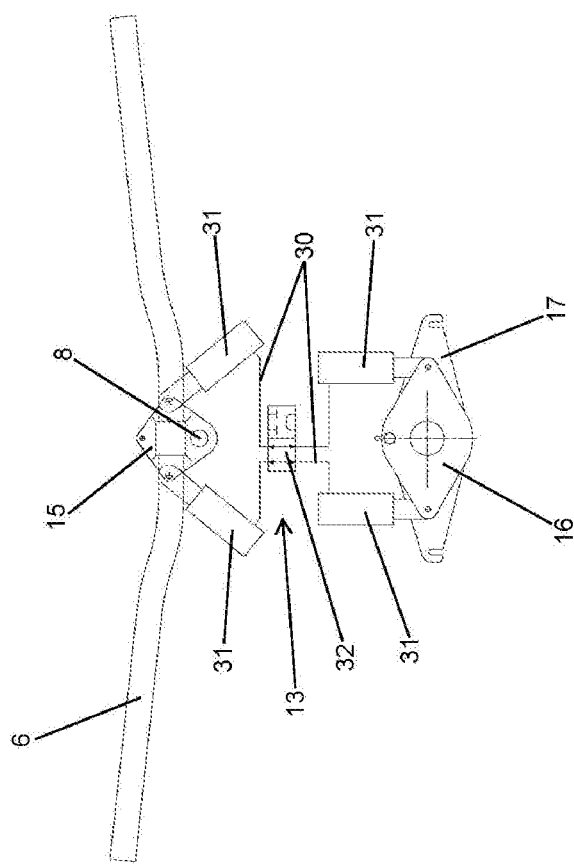
FIG. 20 is a perspective view of another alternative embodiment, with hydraulic cylinders and a hydraulic control valve, of the transmission between the height-tilting suspension of the parallel front wheels and the handlebar of the tricycle.

Likewise, in an alternative manner and as shown in FIG. 20, a hydraulic control valve (32) can be arranged between the hydraulic cylinders (31), which performs the function of the pins (20) and (24) which allows for selectively enabling or disabling the linkage of the movements between the height-tilting suspension (10) and the handlebar (6).

Figure 13:
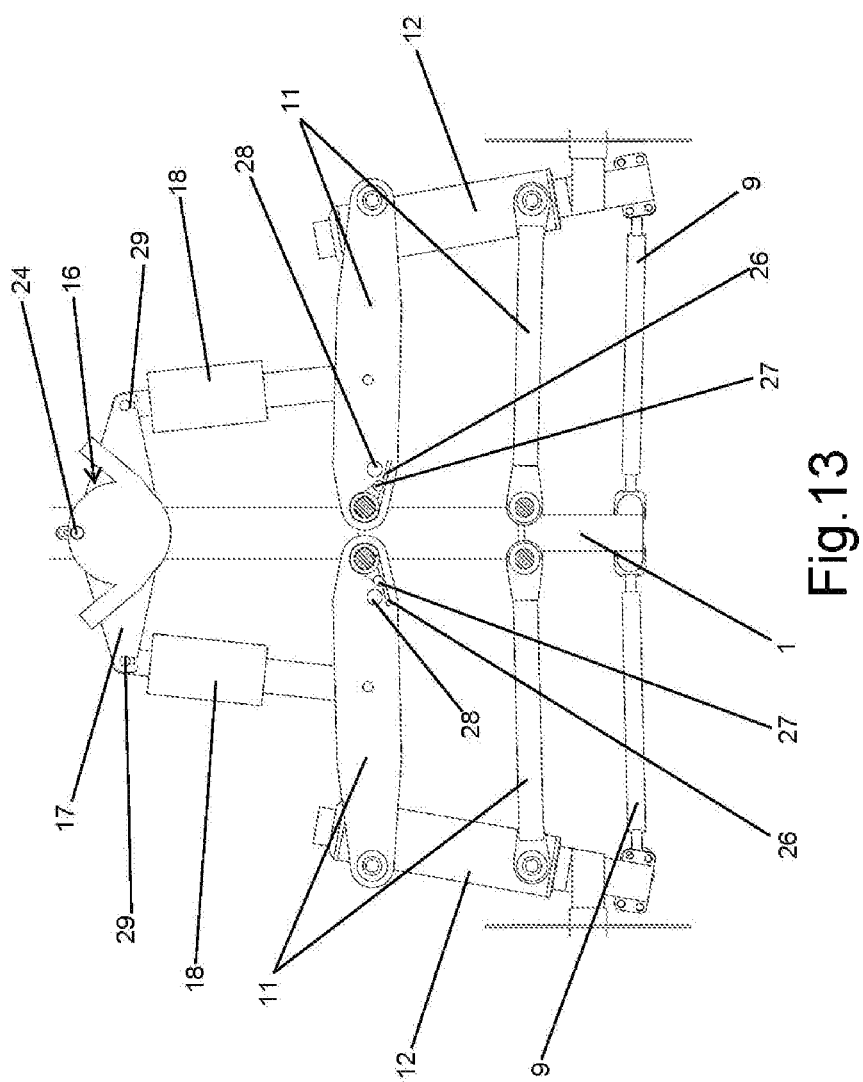
FIG. 13 is a front view of the height-tilting suspension of the parallel front wheels of the tricycle in a horizontal position.
Figure 14:
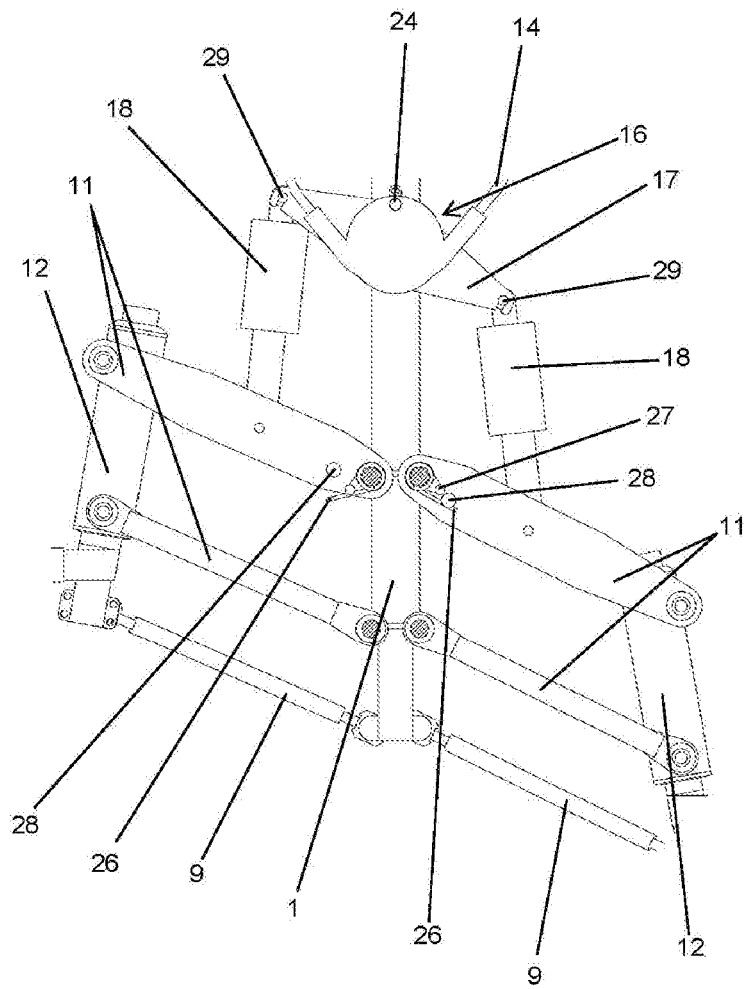
FIG. 14 is a front view of the height-tilting suspension of the parallel front wheels of the tricycle, in a tilted position with one side moved upwards and the other moved downwards with respect to the horizontal axis.
Figure 15:
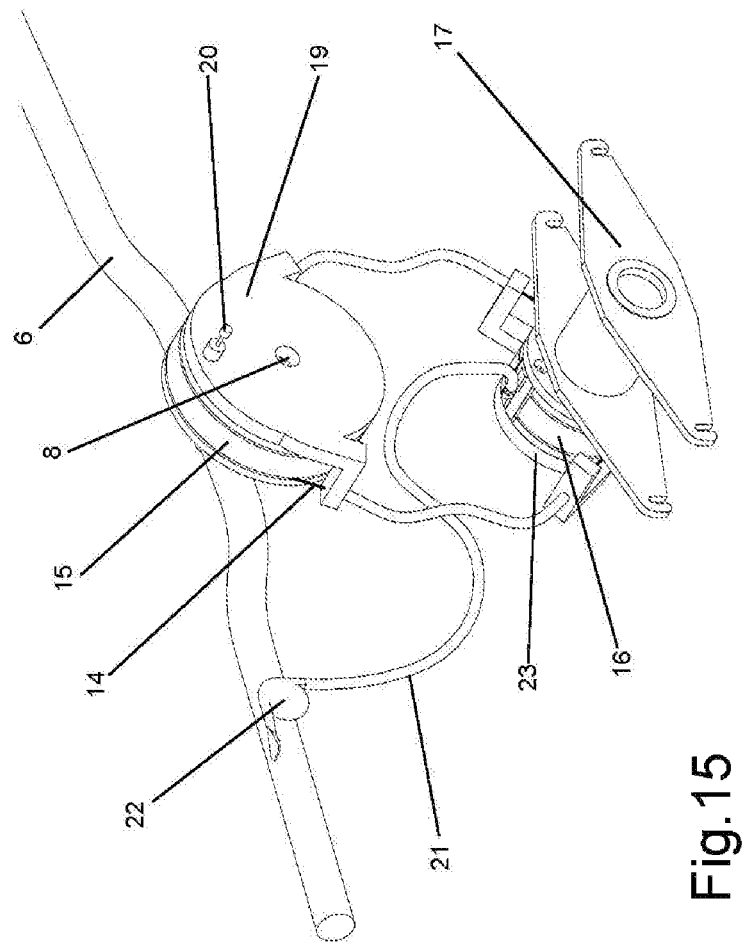
FIG. 15 is a perspective view of the transmission between the height-tilting suspension of the parallel front wheels and the handlebar of the tricycle.

In another safety order, the articulated quadrilaterals of the height-tilting suspension (10) are envisaged with spring straps (26) in some of the articulated joints of the assembly of the arms (11), said spring straps (26) resting on fixed stops (27) which keep them in a pretensioned assembly position, corresponding, as shown by FIG. 13, to when the articulated quadrilaterals of the suspension (10) are in a position close to the intermediate position thereof, meaning when the parallel front wheels (5) of the tricycle are resting at a similar height; pushers (28) moving in relation to the mentioned spring straps (26), which act on the corresponding spring straps (26) when the parallel front wheel (5) of the same side descends causing the deformation of the articulated quadrilaterals of the height-tilting suspension (10), as seen in FIG. 14.

With such an arrangement it is achieved that when the parallel front wheels (5) of the tricycle are positioned at a different height when one of them passes over a bump or an obstacle, and as a consequence the tricycle jumps losing the supporting contact with the ground, during the flight the position of the parallel front wheels (5) at the same height is recovered, due to the actions of the spring strap (26) which is forced as a consequence of the deformation of the articulated quadrilaterals of the height-tilting suspension (10), which prevents the parallel front wheels from returning to rest on the ground in a dangerous arrangement by being uneven.

To that end, the spring straps (26) can be arranged in any of the joints of the articulated quadrilaterals of the height-tilting suspension (10), without the embodiment shown in the FIGS. 13 and 14 thereby being limiting.

Figure 9:
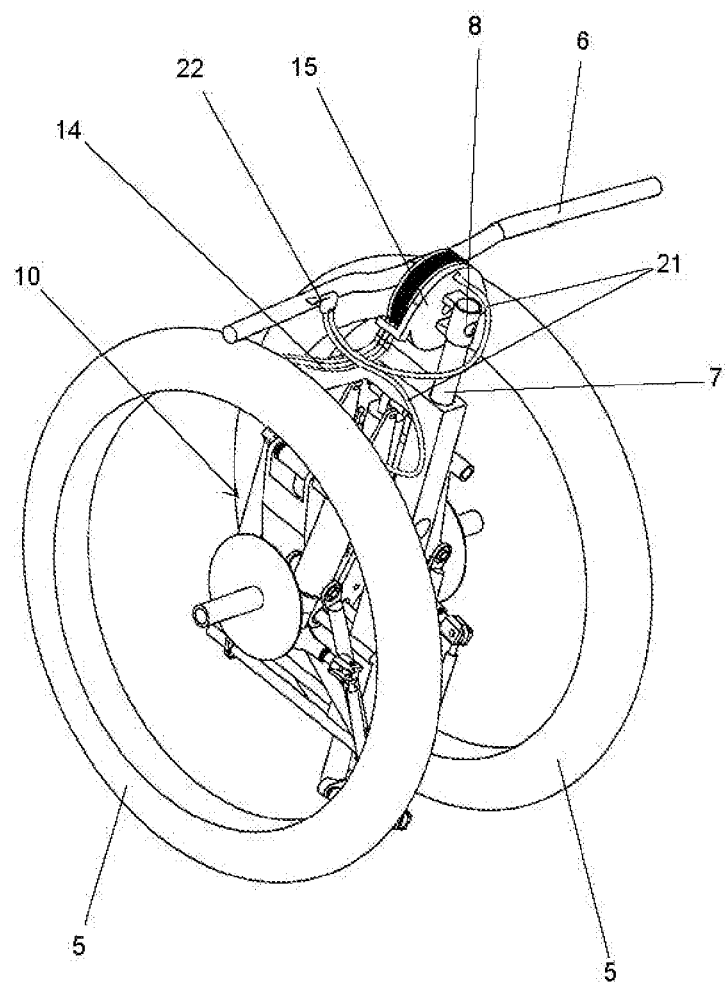
FIG. 9 is a perspective view of the separated front portion of the tricycle, in the folded position.
Figure 10:
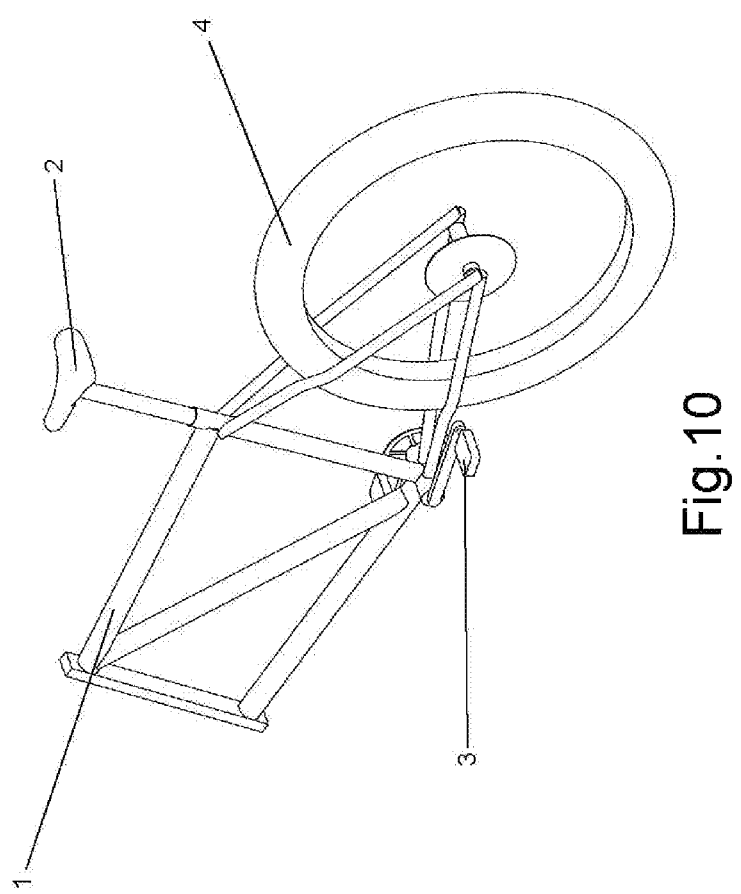
FIG. 10 is a perspective view of the separated rear portion of the tricycle.
Figure 11:
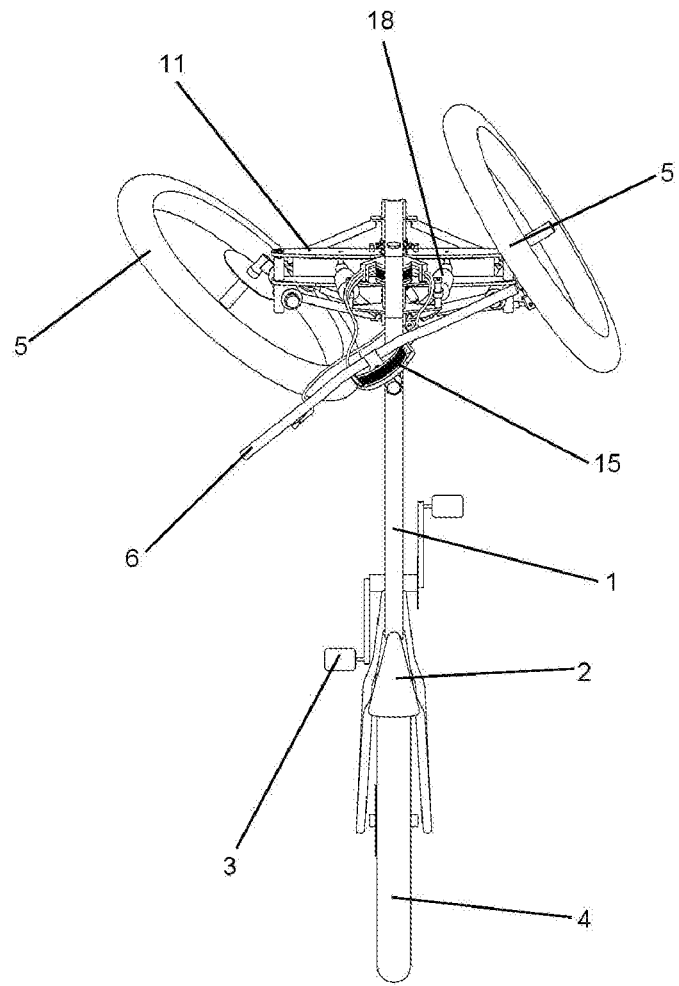
FIG. 11 is a top plan view of the tricycle, with the parallel front wheels rotated towards one side.
Figure 12:
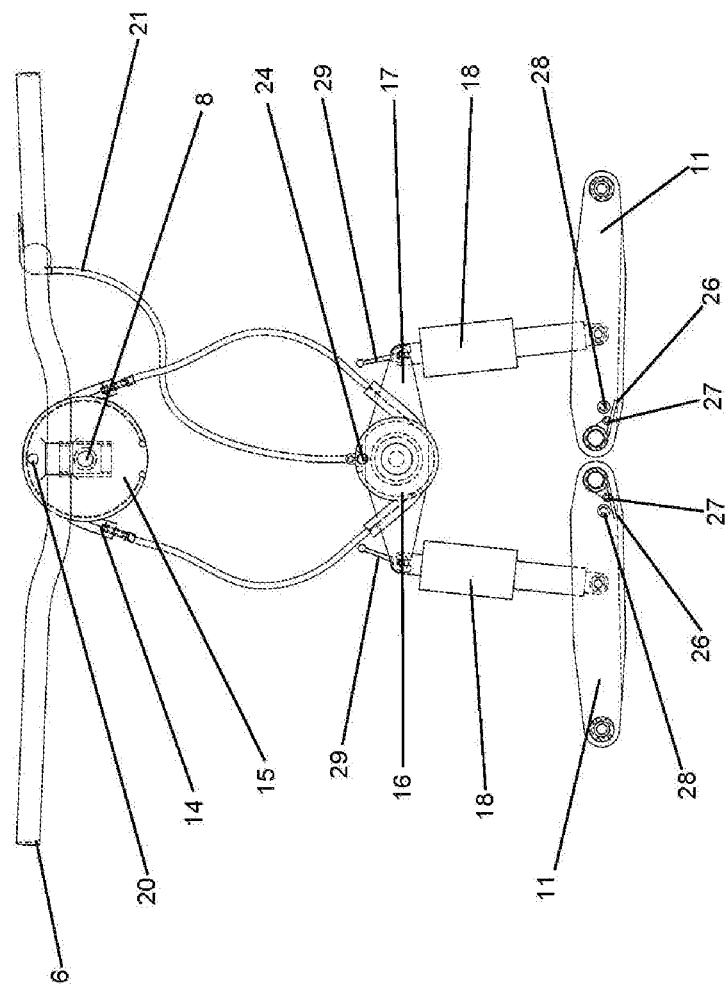
FIG. 12 is a front view of the transmission between the height-tilting suspension of the parallel front wheels and the handlebar of the tricycle.

In order to facilitate the transport and storage of the tricycle, an embodiment is envisaged with the structural chassis (1) of the tricycle made up of two separable portions, one of the portions incorporating the parallel front wheels (5) with the steering and suspension systems, as shown in FIG. 9, and the other portion incorporating the rear wheel (4) with the propulsion system, as shown in FIG. 10.

Figure 8:
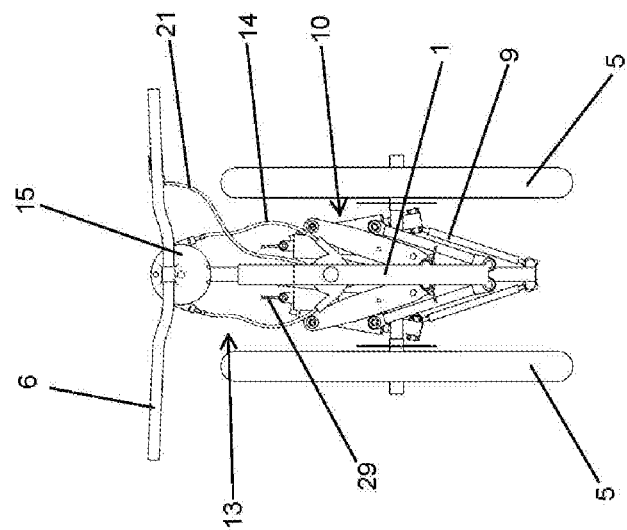
FIG. 8 is a front view of the front portion of the tricycle by itself, in the folded position of the previous figure.
Figure 7:
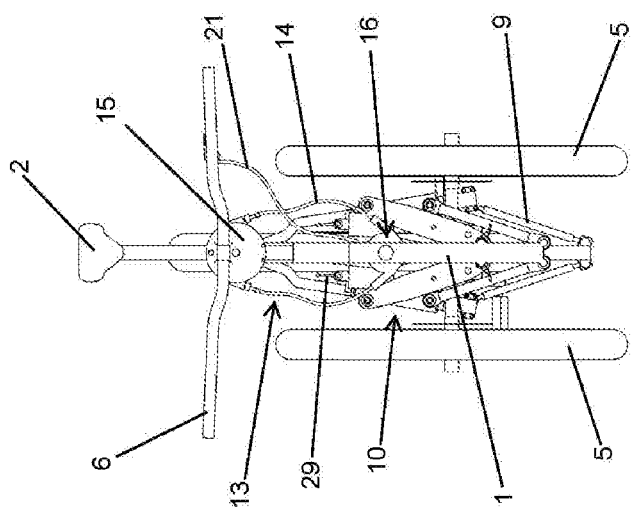
FIG. 7 is a front view of the tricycle with the front portion folded in a transport and storage position.

For the same purpose of facilitating the transportability and the storage of the tricycle, it is envisaged that the height-tilting suspension (10) can be folded reducing the separation between the parallel front wheels (5), without increasing the height of the assembly; to do so, arranging the joints of the ends of the cross bar (17) with the shock-absorbers (18) by means of quick release closures (29) which enable an easy coupling and uncoupling, such that by releasing those joints the cross bar (17) can tilt to a vertical position without the articulated quadrilaterals of the suspension (10) accompanying it, which in those conditions can be folded upwards, as seen in FIGS. 7 and 8.

In the functional order of the actuation for the propulsion of the tricycle, complementing the propulsion system by means of pedals (3), a motor (not shown) can be further incorporated, in order to contribute to an assisting motorised propulsion which enables effort to be saved for the cyclist using the tricycle.

The invention claimed is:

1. A tricycle with height-tilting wheel suspension comprising:
   a structural chassis incorporating a seat, pedals and a rolling assembly made up of a rear wheel associated to a propulsion system and two parallel front wheels;
   a driving handlebar, wherein the two parallel front wheels are linked to the driving handlebar and incorporated in a height-tilting suspension, the height-tilting suspension comprising articulated quadrilaterals able to be deformed independently with vertical movement depending on the individual resting of the parallel front wheels on obstacles or irregularities of the riding terrain;

a transmission connecting the height-tilting suspension to the handlebar, wherein the transmission links the height-oscillating movements of the articulated quadrilaterals of the height-tilting transmission with an equivalent lateral tilting of the handlebar, and wherein the transmission is configured to selectively enable or disable the linkage of the movements between the height-tilting suspension and the driving handlebar, wherein the transmission of the linkage between the height-tilting suspension and the handlebar is established by means of a cable which passes through a pulley secured to the handlebar and through another pulley connected to the cross bar, linking said pulleys and in an association of combined rotation between them, the another pulley incorporating an operable pin to selectively couple the rotation of the assembly.

2. The tricycle with height-tilting wheel suspension according to claim 1, wherein each one of the articulated quadrilaterals of the height-tilting suspension, in which the parallel front wheels are respectively incorporated, comprises arms, wherein one end of each arm is articulately joined to the structural chassis of the tricycle and the other end of each arm is joined to each other by a cross-member articulated with them, and wherein the articulated quadrilaterals are joined, by corresponding shock-absorbers, to the ends of a cross bar which makes up part of the transmission, said cross bar being arranged in an articulation tilting towards the sides, along the middle area thereof, with respect to the structural chassis.

3. The tricycle with height-tilting wheel suspension according to claim 2, wherein the shock-absorbers and the cross bar are joined by quick release closures, which enable folding the width of the tricycle.

4. The tricycle with height-tilting wheel suspension according to claim 1, wherein the articulated quadrilaterals of the height-tilting suspension incorporate spring straps which actuate the recovery of the shape of said articulated quadrilaterals when they are deformed.

5. The tricycle with height-tilting wheel suspension according to claim 1, wherein the cable of the transmission is a multiple cable comprising several parallel cables.

6. The tricycle with height-tilting wheel suspension according to claim 1, wherein the cable of the transmission is associated to joints with elastic elements which prevent overloading.

7. The tricycle with height-tilting wheel suspension according to claim 1, wherein the structural chassis comprises two portions that can be separated, one of the portions incorporating the parallel front wheels and the other portion incorporating the rear wheel.

8. A tricycle with height-tilting wheel suspension comprising:
a structural chassis incorporating a seat, pedals and a rolling assembly made up of a rear wheel associated to a propulsion system and two parallel front wheels;
a driving handlebar, wherein the two parallel front wheels are linked to the driving handlebar and incorporated in a height-tilting suspension, the height-tilting suspension comprising articulated quadrilaterals able to be deformed independently with vertical movement depending on the individual resting of the parallel front wheels on obstacles or irregularities of the riding terrain;
a transmission connecting the height-tilting suspension to the handlebar, wherein the transmission links the height-oscillating movements of the articulated quadrilaterals of the height-tilting transmission with an equivalent lateral tilting of the handlebar, and wherein the transmission is configured to selectively enable or disable the linkage of the movements between the height-tilting suspension and the driving handlebar, wherein the transmission of the linkage between the height-tilting suspension and the handlebar is established by hoses connected by hydraulic cylinders to a pulley secured to the handlebar and by other hydraulic cylinders to another pulley connected to the cross bar, linking said pulleys and in an association of combined rotation between them, the another pulley incorporating an operable pin to selectively couple the rotation of the assembly.

9. The tricycle with height-tilting wheel suspension according to claim 8, wherein each one of the articulated quadrilaterals of the height-tilting suspension, in which the parallel front wheels are respectively incorporated, comprises arms, wherein one end of each arm is articulately joined to the structural chassis of the tricycle and the other end of each arm is joined to each other by a cross-member articulated with them, and wherein the articulated quadrilaterals are joined, by corresponding shock-absorbers, to the ends of a cross bar which makes up part of the transmission, said cross bar being arranged in an articulation tilting towards the sides, along the middle area thereof, with respect to the structural chassis.

10. The tricycle with height-tilting wheel suspension according to claim 9, wherein the shock-absorbers and the cross bar are joined by quick release closures, which enable folding the width of the tricycle.

11. The tricycle with height-tilting wheel suspension according to claim 8, wherein the articulated quadrilaterals of the height-tilting suspension incorporate spring straps which actuate the recovery of the shape of said articulated quadrilaterals when they are deformed.

12. The tricycle with height-tilting wheel suspension according to claim 8, wherein the structural chassis comprises two portions that can be separated, one of the portions incorporating the parallel front wheels and the other portion incorporating the rear wheel.

13. A tricycle with height-tilting wheel suspension comprising:
a structural chassis incorporating a seat, pedals and a rolling assembly made up of a rear wheel associated to a propulsion system and two parallel front wheels;
a driving handlebar, wherein the two parallel front wheels are linked to the driving handlebar and incorporated in a height-tilting suspension, the height-tilting suspension comprising articulated quadrilaterals able to be deformed independently with vertical movement depending on the individual resting of the parallel front wheels on obstacles or irregularities of the riding terrain;
a transmission connecting the height-tilting suspension to the handlebar, wherein the transmission links the height-oscillating movements of the articulated quadrilaterals of the height-tilting transmission with an equivalent lateral tilting of the handlebar, and wherein the transmission is configured to selectively enable or disable the linkage of the movements between the height-tilting suspension and the driving handlebar, wherein the transmission of the linkage between the height-tilting suspension and the handlebar is established by hoses connected hydraulic cylinders to a pulley secured to the handlebar and by other hydraulic cylinders to another pulley connected to the cross bar, linking said pulleys and in an association of combined rotation between them, comprising a hydraulic control valve to selectively couple the rotation of the assembly.

14. The tricycle with height-tilting wheel suspension according to claim 13, wherein each one of the articulated quadrilaterals of the height-tilting suspension, in which the parallel front wheels are respectively incorporated, comprises arms, wherein one end of each arm is articulately joined to the structural chassis of the tricycle and the other end of each arm is joined to each other by a cross-member articulated with them, and wherein the articulated quadrilaterals are joined, by corresponding shock-absorbers, to the ends of a cross bar which makes up part of the transmission, said cross bar being arranged in an articulation tilting towards the sides, along the middle area thereof, with respect to the structural chassis.

15. The tricycle with height-tilting wheel suspension according to claim 14, wherein the shock-absorbers and the cross bar are joined by quick release closures, which enable folding the width of the tricycle.

16. The tricycle with height-tilting wheel suspension according to claim 13, wherein the articulated quadrilaterals of the height-tilting suspension incorporate spring straps which actuate the recovery of the shape of said articulated quadrilaterals when they are deformed.

17. The tricycle with height-tilting wheel suspension according to claim 13, wherein the structural chassis comprises two portions that can be separated, one of the portions incorporating the parallel front wheels and the other portion incorporating the rear wheel.

\* \* \* \* \*